United States Patent
Kawasaki et al.

(10) Patent No.: US 10,712,267 B2
(45) Date of Patent: Jul. 14, 2020

(54) CLEANING-PERFORMANCE EVALUATION SYSTEM

(71) Applicant: AIREX CO., LTD., Nagoya-shi, Aichi (JP)

(72) Inventors: Koji Kawasaki, Nagoya (JP); Haruka Hutamura, Nagoya (JP); Yukihiro Yazaki, Nagoya (JP); Zhiqiang Guo, Nagoya (JP); Tsukasa Kitano, Nagoya (JP)

(73) Assignee: AIREX CO., LTD., Aichi (JP)

( * ) Notice: Subject to any disclaimer, the term of this patent is extended or adjusted under 35 U.S.C. 154(b) by 0 days.

(21) Appl. No.: 16/304,891

(22) PCT Filed: Feb. 2, 2018

(86) PCT No.: PCT/JP2018/003561
§ 371 (c)(1),
(2) Date: Nov. 27, 2018

(87) PCT Pub. No.: WO2018/147178
PCT Pub. Date: Aug. 16, 2018

(65) Prior Publication Data
US 2020/0011791 A1    Jan. 9, 2020

(30) Foreign Application Priority Data
Feb. 13, 2017    (JP) ................................. 2017-023750

(51) Int. Cl.
*G01N 21/64*    (2006.01)
*G01N 15/06*    (2006.01)

(52) U.S. Cl.
CPC ............. *G01N 21/64* (2013.01); *G01N 15/06* (2013.01); *G01N 2015/0693* (2013.01)

(58) Field of Classification Search
CPC . G01N 21/64; G01N 15/06; G01N 2015/0693
See application file for complete search history.

(56) References Cited

FOREIGN PATENT DOCUMENTS

| JP | 2000185265 | 7/2000 | |
|----|------------|--------|---|
| JP | 2003088816 | 3/2003 | |
| JP | 2003088816 A | * 3/2003 | ............. G01N 21/33 |

* cited by examiner

*Primary Examiner* — Jamil Ahmed
(74) *Attorney, Agent, or Firm* — Quarles & Brady LLP; Yakov Sidorin (57) ABSTRACT

The present invention provides a cleaning-performance evaluation system that can acquire evaluation results in real time as quantitative values without such factors as the experience of evaluators causing variations in evaluations. The present invention includes: a contamination means for administering a mock contaminant to the inside of a work chamber; a waste liquid recovery means for performing a cleaning operation and recovering a cleaning waste-liquid that contains the mock contaminant; a mist generation means for generating a mist of the cleaning waste-liquid; a collection means for collecting inspection air that includes the generated mist; and a detection means for detecting the amount of the mock contaminant included in the inspection air collected by the collection means. The present invention evaluates the cleaning operation by confirming that the amount of the mock contaminant detected by the detection means is at or below a prescribed value.

7 Claims, 4 Drawing Sheets

CLEANING-PERFORMANCE EVALUATION SYSTEM

CROSS-REFERENCE TO RELATED APPLICATIONS

This patent application represents the U.S. national stage entry of International Application No. PCT/JP2018/003561, filed on Feb. 2, 2018, and claims priority from Japanese Patent Application No. 2017-023750, filed on Feb. 13, 2017. The disclosure of each of the above-identified patent documents is incorporated by reference herein.

TECHNICAL FIELD

The present invention relates to a cleaning-performance evaluation system used for evaluating a cleaning operation predetermined on the inside of manufacturing equipment and others so that substances such as pharmaceuticals with high pharmacological activity that affect the human body and the environment fail to leak to the external environment.

BACKGROUND

In equipment for manufacturing and handling pharmaceuticals with high pharmacological activity such as anticancer agents and immunosuppressants, the use of devices such as sealing isolators is required to manage such pharmaceuticals to prevent the same from polluting operators and the external environment. For example, in operations for employing injectable solutions and others as freeze-dried products, high-quality sterile environment is required when a vial for freeze-drying is filled with an injectable solution.

However, these operations can cause leak of injectable solutions, or damage to a vial might cause a scattered injectable solution to become a droplet (mist), spreading into an isolator and leaking from the isolator to the external environment. Another risk is, on the other hand, that powdery medicine after freeze-drying can leak from the isolator to the external environment due to vial damage.

Thus, in equipment for manufacturing and handling pharmaceuticals with high pharmacological activity, thorough sealing of devices such as an isolator is required. One such example is the following Patent Document 1 that relates to a freeze-dried preparation manufacturing system. This document provides a proposal for a freeze-dried preparation manufacturing system that prevents a medicine component from being scattered in the surrounding environment in which the manufacturing system is placed.

PRIOR ART DOCUMENTS

Patent Documents

Patent Document 1: JP-A-2016-158635

SUMMARY OF THE INVENTION

Problem to be Solved by the Invention

By the way, the above Patent Document 1 and other related documents relate to sealing technology when equipment for manufacturing and handling pharmaceuticals with high pharmacological activity is used. On the other hand, such equipment for manufacturing and handling pharmaceuticals with high pharmacological activity essentially needs cleaning. In particular, handling and cleaning operations are conducted according to a predetermined cleaning manual to deal with solution overspill and vial damage, respectively. Accordingly, it is necessary to prepare a proper cleaning manual by evaluating cleaning operations beforehand. However, since manufacturing and handling equipment include various types of apparatuses, doors and ports inside thereof that are complex-shaped, cleaning operations must correspond to respective components.

Under the circumstances, the following cleaning-performance tests are generally carried out to evaluate a cleaning operation. First, a substance is administered as a mock contaminant that is harmless to the human body and environmentally nonpolluting to generate the state of contamination inside the equipment. Illustrative example of a mock contaminant includes an aqueous solution in which riboflavin as a fluorescence material or a derivative thereof is dissolved. Predetermined evaluation points are sprayed with an aqueous solution of these fluorescence materials to visually confirm the degree of contamination using UV light.

Then, a predetermined cleaning operation is carried out for each of the evaluation points. In this operation, cleaning water's water pressure, time required and water volume are recorded. After the cleaning operation, the fluorescence intensity is visually confirmed at an evaluation point. The general evaluation criterion is that the fluorescence intensity of an evaluation point after each cleaning operation is $\frac{1}{100}$ or less of the fluorescence intensity of a fluorescence material with which an evaluation point is first sprayed. This visual confirmation in the evaluation of cleaning operations is conventionally problematic in that variations in evaluations can be caused depending on such factors as the experience of evaluators.

To deal with the above problems, the present invention has an object to provide a cleaning-performance evaluation system that can acquire evaluation results in real time as quantitative values without such factors as the experience of evaluators causing variations in evaluations.

Means for Solving the Problem

To solve these problems, inventors of the present invention have carried out an extended investigation and found that by converting into a mist a waste liquid containing a mock contaminant discharged by a cleaning operation, the fluorescent emission intensity of the mock contaminant contained therein is measured. Based on that information, the present invention was accomplished.

Specifically, a cleaning-performance evaluation system of the present invention, according to claim 1, used for evaluating a cleaning operation inside a work chamber (12), functions as an inspection system (20) for inspecting the cleaning-performance of a mock contaminant generated inside the work chamber, including:

a contamination means (22) for administering the mock contaminant to the inside of the work chamber;

a waste liquid recovery means (24) for performing the cleaning operation and recovering a cleaning waste-liquid (33) that contains the mock contaminant;

a mist generation means (26) for generating a mist of the cleaning waste-liquid;

a collection means (27) for collecting inspection air that includes the generated mist; and a detection means (28) for detecting the amount of the mock contaminant included in the inspection air collected by the collection means, wherein the cleaning operation is evaluated by confirming that the amount of the mock contaminant detected by the detection means is at or below a prescribed value.

In addition, the present invention, according to claim 2, is the cleaning-performance evaluation system according to claim 1, in which the detection means includes a fine particle detecting part and a fluorescence detecting part, the fine particle detecting part detects the total particle concentration of the mock contaminant in the inspection air, and the fluorescence detecting part detects the positive particle concentration in the inspection air, whereby the positive particle ratio is calculated by the total particle concentration and the positive particle concentration to confirm the amount of the mock contaminant.

In addition, the present invention, according to claim 3, is the cleaning-performance evaluation system according to claim 2, in which the fluorescence detecting part detects the mock contaminant in the inspection air using laser induced fluorometry.

In addition, the present invention, according to claim 4, is the cleaning-performance evaluation system according to any one of claims 1 to 3, in which the mist generation means is an ultrasonic atomizing device.

In addition, the present invention, according to claim 5, is the cleaning-performance evaluation system according to any one of claims 1 to 4, in which the mock contaminant is an aqueous solution of a fluorescence material.

In addition, the present invention, according to claim 6, is the cleaning-performance evaluation system according to claim 5, in which the aqueous solution of the fluorescence material is an aqueous solution in which riboflavin or a derivative thereof is dissolved.

In addition, the present invention, according to claim 7, is the cleaning-performance evaluation system according to claim 6, in which the aqueous solution of the fluorescence material is an aqueous solution of riboflavin sodium phosphate.

Effect of the Invention

According to the configuration of the above claim 1, a cleaning-performance evaluation system of the present invention includes a contamination means, a waste liquid recovery means, a mist generation means, a collection means, and a detection means. The contamination means administers a mock contaminant to the inside of a work chamber. The waste liquid recovery means performs a cleaning operation and recovers a cleaning waste-liquid that contains the mock contaminant. The mist generation means generates a mist of the cleaning waste-liquid. The collection means collects inspection air that includes the generated mist. The detection means detects the amount of the mock contaminant included in the inspection air collected by the collection means.

Accordingly, the present invention can provide a cleaning-performance evaluation system that can acquire evaluation results in real time as quantitative values without such factors as the experience of evaluators causing variations in evaluations.

In addition, according to the configuration of the above claim 2, the detection means includes a fine particle detecting part and a fluorescence detecting part. The fine particle detecting part instantly detects the total particle concentration of the mock contaminant in the inspection air. In addition, the fluorescence detecting part instantly detects the positive particle concentration in the inspection air. Furthermore, the positive particle ratio is calculated by the total particle concentration and the positive particle concentration. Accordingly, according to the configuration of the above claim 2, the same effects as claim 1 can be provided more specifically.

In addition, according to the configuration of the above claim 3, the fluorescence detecting part detects the mock contaminant in the inspection air using laser induced fluorometry. Consequently, according to the configuration of the above claim 3, the same effects as claim 2 can be provided more specifically.

In addition, according to the configuration of the above claim 4, the mist generation means is an ultrasonic atomizing device. Consequently, according to the configuration of the above claim 4, the same effects as any one of claims 1 to 3 can be provided more specifically.

In addition, according to the configuration of the above claim 5, the mock contaminant is an aqueous solution of a fluorescence material. Consequently, according to the configuration of the above claim 5, the same effects as any one of claims 1 to 4 can be provided more specifically.

In addition, according to the configuration of the above claim 6, the aqueous solution of the fluorescence material is an aqueous solution in which riboflavin or a derivative thereof is dissolved. Consequently, according to the configuration of the above claim 6, the same effects as claim 5 can be provided more specifically.

In addition, according to the configuration of the above claim 7, the aqueous solution of the fluorescence material is an aqueous solution of riboflavin sodium phosphate. Consequently, according to the configuration of the above claim 7, the same effects as claim 6 can be provided more specifically.

DESCRIPTION OF THE PREFERRED EMBODIMENTS

The present invention will be described in detail as follows. This embodiment relates to an inspection system for evaluating a cleaning operation beforehand to prepare a cleaning manual inside a sealing isolator used in facilities for manufacturing, and researching and developing pharmaceuticals with high pharmacological activity such as anti-cancer agents that provides the human body with significant pharmacological effects in small quantities.

Figure 1:
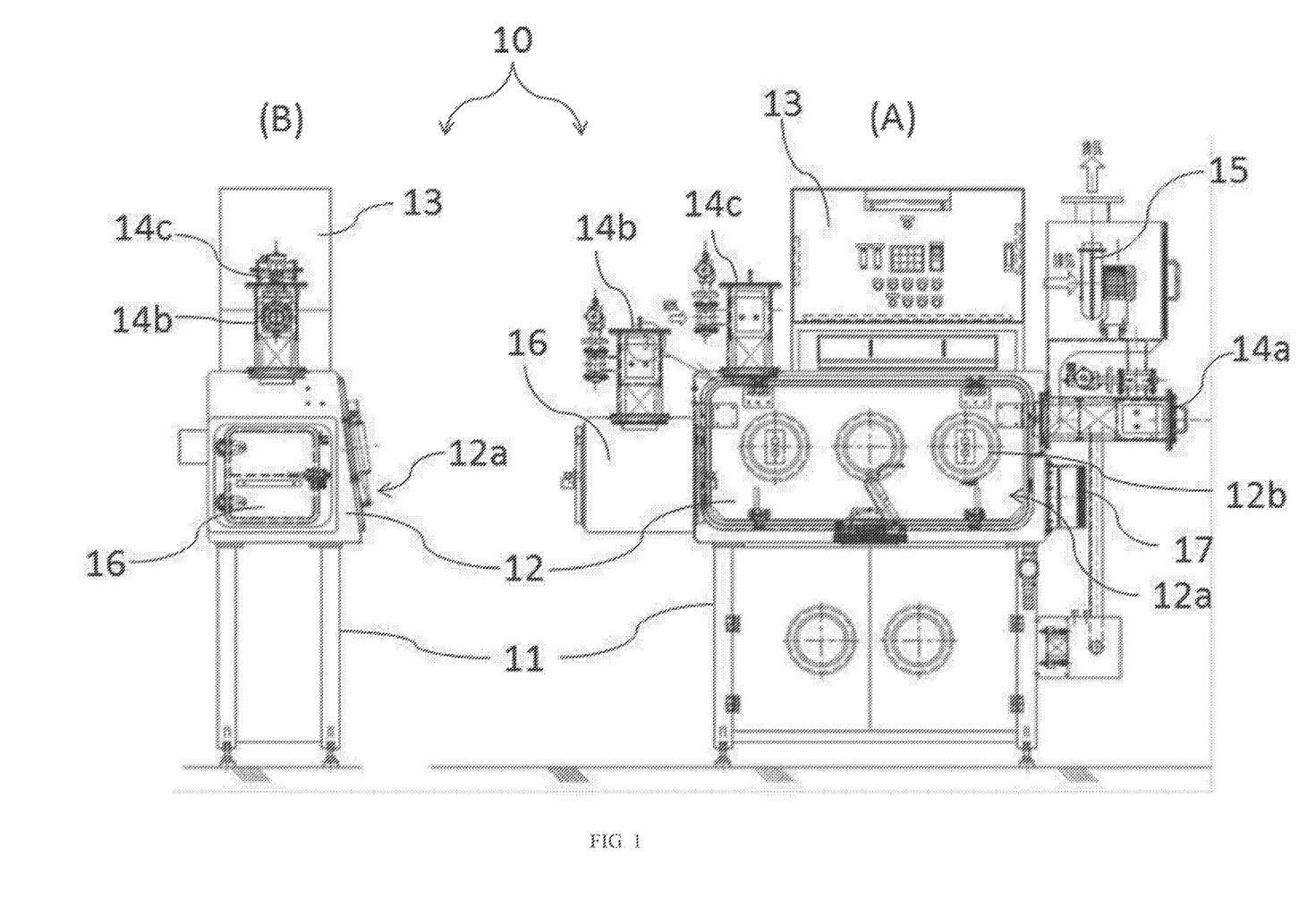
FIG. 1 is a front view and a left side view of an isolator for evaluating a cleaning operation according to one embodiment of the present invention.

FIG. 1 is a front view "A" and a left side view "B" of an isolator 10 for evaluating a cleaning operation according to this embodiment. In FIG. 1, the isolator 10 includes a frame 11 placed on the floor, a work chamber (chamber) 12 mounted on the frame 11, and a controller 13 joined on the wall of the upper surface of the chamber 12.

The chamber 12, formed of a stainless steel box body airtightly shielded from the external environment, includes filter units 14a, 14b, 14c for intake and exhaust, and a blower 15 for filtering air inside the chamber 12 with the filter units and then discharging the air to the outside. In addition, the chamber 12 is also provided with a pass box 16 and a bug-out port 17 arranged on the walls on the left side and the right side, respectively.

The wall in front of the chamber 12 is provided with a door 12a. The door 12a includes 3 circular glove ports 12b for connecting the outside and the inside of the chamber 12. To these glove ports 12b are airtightly attached work gloves, respectively.

In this embodiment, the chamber 12 is subjected to a cleaning operation inside the same to evaluate the cleaning-performance. It is to be noted that, inside the chamber 12, several components such as the door 12a, the pass box 16, and the bug-out port 17 have positional difficulties in cleaning. Therefore, before using the isolator 10 as a sealing isolator, it is essential to bring a cleaning manual to completion primarily in these positions.

Figure 2:
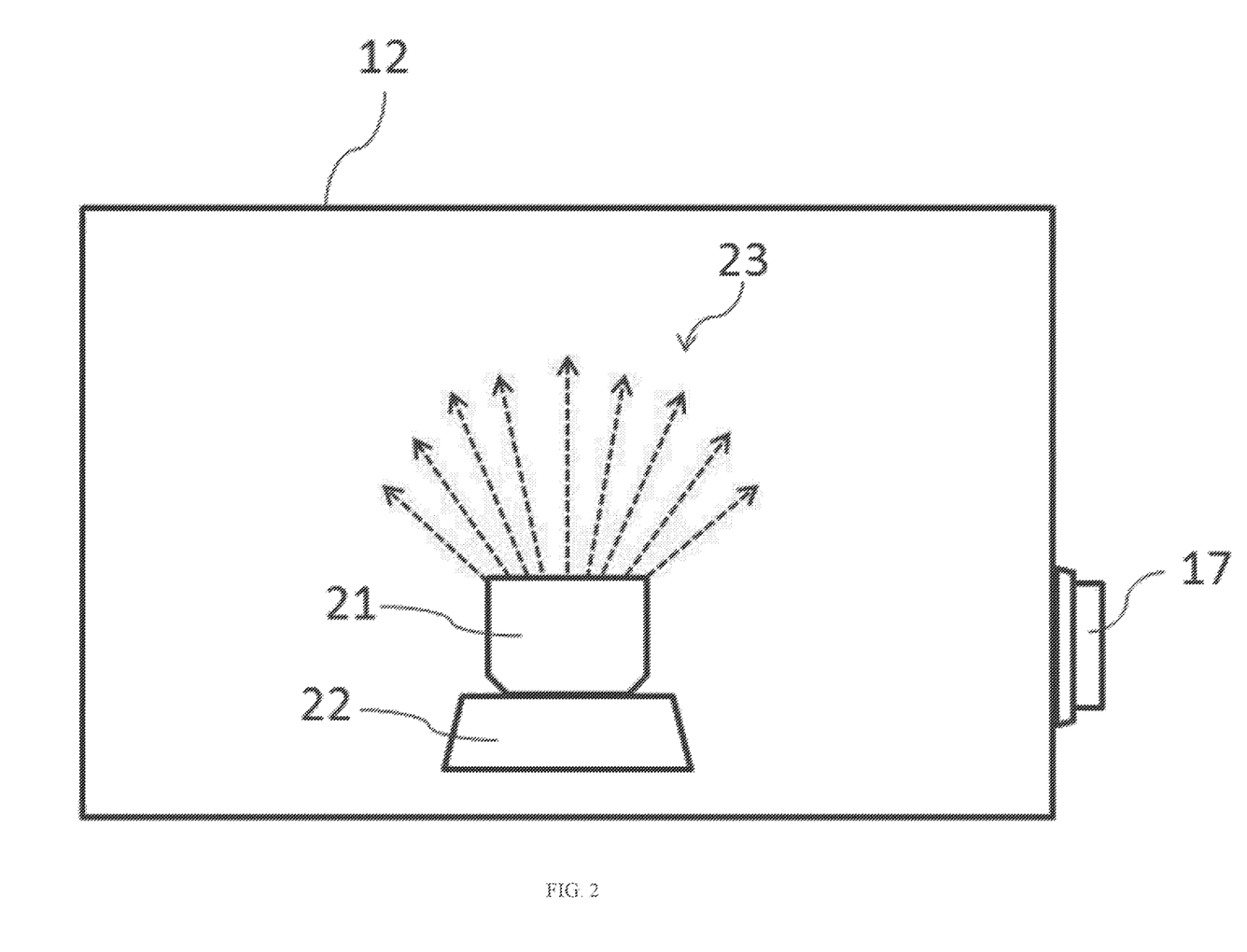
FIG. 2 is a schematic diagram showing a mock contaminant is scattered inside a chamber of the isolator of FIG. 1.

Herein, the evaluation of cleaning-performance on the inside of the chamber 12 of the isolator 10 will be described. FIG. 2 is a schematic diagram showing a mock contaminant is scattered inside the chamber 12. In FIG. 2, inside the chamber 12 are stored a mock contaminant, a container 21 for storing the same, and an ultrasonic atomizing device 22 for generating a mist by providing ultrasonic vibration to them. In this embodiment, these devices function as a contamination means of a cleaning-performance evaluation system.

In cleaning tests, in place of a droplet (mist) or a powder of actual pharmaceuticals with high pharmacological activity, a mock contaminant that is harmless to the human body and environmentally nonpolluting is used as a mist. Specifically, the mock contaminant is an aqueous solution of a fluorescence material (later-described) to generate a mist 23 by providing an aqueous solution stored in a container 21 with ultrasonic vibration by the ultrasonic atomizing device 22 (see FIG. 2). The generated mist of the mock contaminant attaches to the inner wall of the isolator, and it is subjected to a cleaning operation. It is to be noted that, in place of the contamination means by ultrasonic vibration, an aqueous solution of a fluorescence material may be sprayed with a spray as conventionally employed. In this case, a spraying means such as a spray functions as a contamination means of a cleaning-performance evaluation system.

Herein, the fluorescence material employed in this embodiment will be described. The fluorescence material used in the present invention is not particularly restricted so long as it is a fluorescent substance. It is to be noted that, in this embodiment, it is preferably a substance that is harmless to the human body and environmentally nonpolluting, and water-soluble. Since the fluorescence material is water-soluble, without the use of other solvents, an aqueous solution can readily be adjusted to be converted into a mist.

It is to be noted that various types of fluorescence materials that are harmless to the human body and environmentally nonpolluting and water-soluble can be adopted. It is to be noted that, in this embodiment, riboflavin (vitamin B2) or a derivative thereof that is conventionally used in cleaning evaluation is employed. Specifically, riboflavin sodium phosphate was used. The solubility of the riboflavin sodium phosphate to water is 50 g/L, showing sufficient water solubility.

In addition, the concentration of an aqueous solution of the riboflavin sodium phosphate may be in the range so that the fluorescence of a mist of a cleaning waste-liquid can be detected by a detector (later-described). When riboflavin sodium phosphate is used as the fluorescence material, the range of detection of a mist 23 by a detector is $1 \times 10^{-6}$% by mass to 5.0% by mass (solubility limit) (the detail later described). It is to be noted that the range of detection is preferably 0.1% by mass to 2.0% by mass in aqueous solution. This is because that when the concentration of riboflavin sodium phosphate is 0.1% by mass or less, the detection sensitivity in cleaning evaluation is lower, and when the concentration is 2.0% by mass or more, the amount of a fluorescence material used to be scattered is larger, resulting in more difficult cleaning evaluation. It is to be noted that, in this embodiment, a 0.2% riboflavin sodium phosphate aqueous solution was employed.

Then, a mist generation means using an aqueous solution of a fluorescence material as a mist will be described. In FIG. 2, the container 21 for storing an aqueous solution of a fluorescence material (0.2% riboflavin sodium phosphate aqueous solution) is placed on the vibration surface of the ultrasonic atomizing device 22 as a mist generation means to generate a mist 23 of the fluorescence material. It is to be noted that the configuration and performance of the ultrasonic atomizing device 22 are not particularly restricted. However, the mist preferable has a proper drop size by using the aqueous solution of the fluorescence material as a mock contaminant. The proper drop size as a mock contaminant refers to scattering behavior that is similar to a mist of an actual pharmaceutical with high pharmacological activity (solution before freeze-drying) or powder (powder after freeze-drying). For this purpose, the frequency and output of the ultrasonic atomizing device 22 are adjusted in view of the specific gravity and the drop size of the mist 23 of the mock contaminant.

Figure 3:
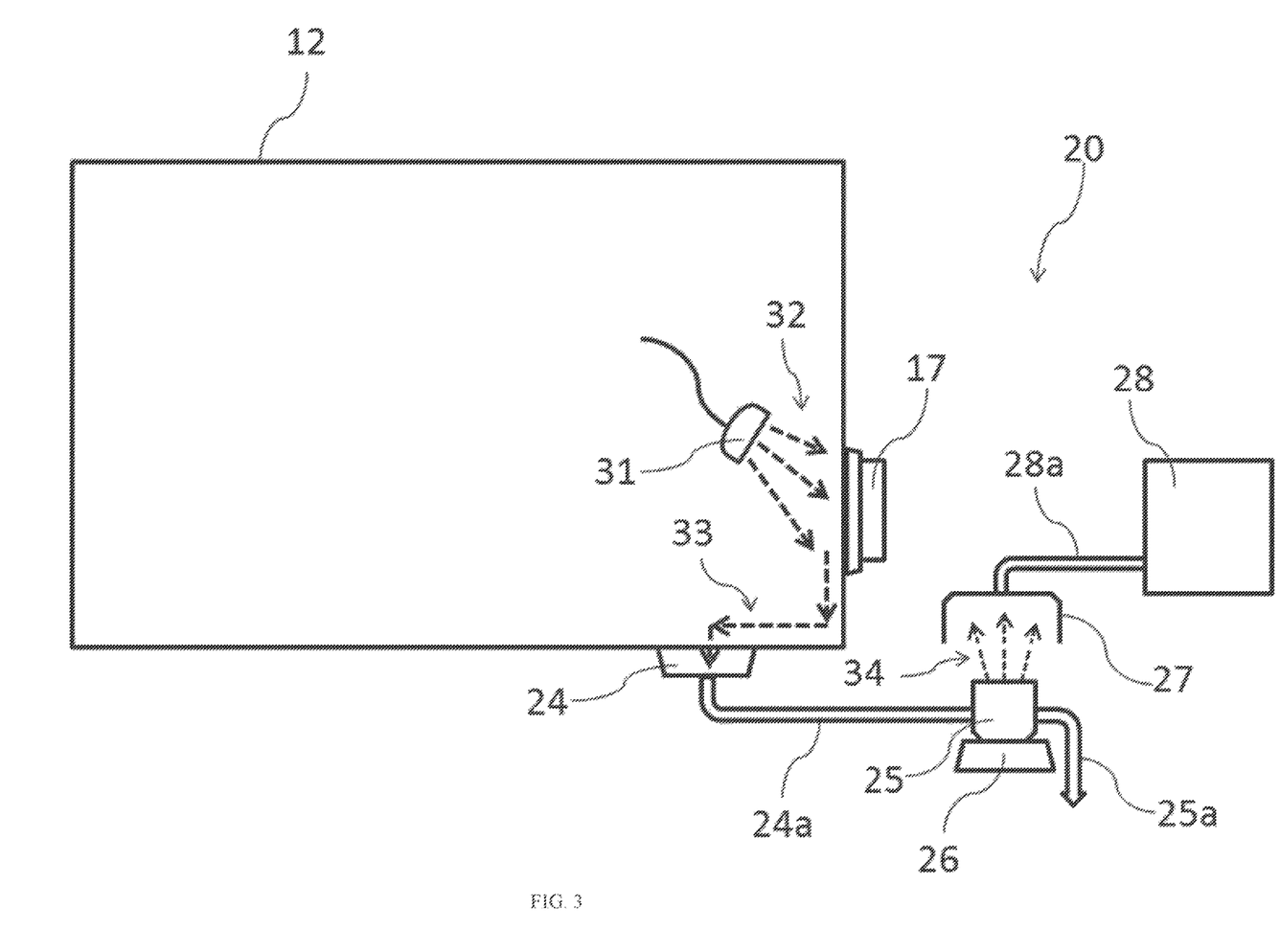
FIG. 3 is a schematic diagram showing the evaluation of a cleaning operation inside the chamber in which the mock contaminant is scattered in FIG. 2.

Then, a cleaning operation for cleaning the inside of the chamber 12 will be started. FIG. 3 is a schematic diagram showing the evaluation of a cleaning operation inside the chamber in which the mock contaminant is scattered. In FIG. 3, the inside of a bug-out port 17 was subjected to a cleaning evaluation as an evaluation point of difficult cleaning.

In the evaluation of the cleaning operation in FIG. 3, the cleaning-performance evaluation system 20 that is not related to the above contamination means will be described. Specifically, the cleaning-performance evaluation system 20 includes a wastewater pit 24 for recovering a cleaning waste-liquid, a waste liquid container 25 for storing the wastewater, an ultrasonic atomizing device 26 for generating a mist by providing ultrasonic vibration to them, a collector 27 for collecting the generated mist, and a detector 28 for detecting the collected mist. It is to be noted that the wastewater pit 24 and the waste liquid container 25 are connected by a waste liquid pipe 24a, and the collector 27 and the detector 28 are connected by a suction pipe 28a.

The cleaning operation cleans the bug-out port 17 from the inside of the chamber 12. First, using a cleaning spray 31, a cleaning water 32 is discharged to the inside of the bug-out port 17 under planned conditions (direction, water pressure, time and water volume). The cleaning water 32 for cleaning the inside of the bug-out port 17 is converted into a cleaning waste-liquid 33 to be collected by the wastewater pit 24 of the chamber 12.

The cleaning waste-liquid 33 collected by the wastewater pit 24 is continuously fed into the waste liquid container 25 via the waste liquid pipe 24a. As another cleaning waste-liquid 33 is fed into the waste liquid container 25, the cleaning waste-liquid 33 in the waste liquid container 25 is discharged via a waste liquid pipe 25a. Accordingly, the cleaning waste-liquid 33 in the waste liquid container 25 always indicates the last cleaning operation, and with time, indicates the concentration of a fluorescence material removed by a cleaning operation.

Then, the waste liquid container 25 for storing the cleaning waste-liquid 33 fed with time is placed on the vibration surface of the ultrasonic atomizing device 26 as a mist generation means to generate a mist 34 of the cleaning waste-liquid 33. It is to be noted that the configuration and performance of the ultrasonic atomizing device 26 are not particularly restricted, but the frequency and output of the ultrasonic atomizing device 26 are adjusted in view of the detection accuracy by the later-described detector 28.

Then, the generated mist 34 is collected by the collector 27 as inspection air together with ambient air. The inspection air collected by the collector 27 is fed into the detector 28 as a detection means via the suction pipe 28a. It is to be noted that the detector 28 includes a pump (not shown) for sucking inspection air.

Herein, the detector 28 will be described. In this embodiment, a Rapid Microbiological device used in Rapid Microbiological Method (RMM) can be used as the detector 28. The Rapid Microbiological device generally includes a particle counter and a floated microbe counter. These counters suck a certain amount of inspection air fed from the suction pipe from a collecting opening as a sample to detect particles (fine particles) and floated microbes (microorganism fine particles) therein with an optical measuring instrument. Recently in particular, Rapid Microbiological devices using optical measuring instruments, as a method for instantly determining a microorganism-derived fine particle, have been said to achieve more significant work efficiency than conventional culture methods. In this embodiment, a Rapid Microbiological device is used to detect a fluorescent mist, rather than to measure floated microbes (microorganism fine particles).

In this embodiment, as a fine particle detecting part of the detector 28, a particle counter using particle size selection by light scattering method was adopted. The particle counter instantly detects the total number of fine particles in inspection air. It is to be noted that, in this embodiment, the total number of fine particles detected by the particle counter is defined as "total particle concentration (/L)" in the inspection air.

Meanwhile, as a fluorescence detecting part of the detector 28, a floated microbe counter, using fluorescence identification by laser induced fluorometry, was adopted. The laser induced fluorometry refers to the use of fine particles related to microorganisms or cell viability out of fine particles floating in the inspection air that are excited by ultraviolet rays to generate fluorescence. The floated microbe counter instantly detects the total number of fluorescence fine particles in the inspection air. It is to be noted that, in this embodiment, the total number of fluorescence fine particles detected by the floated microbe counter is defined as "positive particle concentration (/L)" in the inspection air.

Then, in this embodiment, the positive particle ratio (%) is calculated from the total particle concentration (/L) detected by the particle counter and the positive particle concentration (/L) detected by the floated microbe counter. When the positive particle ratio (%) can obviously be identified with the positive particle ratio (%) of the background (mist of water containing no fluorescence material), it can be determined that a mock contaminant is found in the inspection air.

Herein, in this embodiment, by detecting the amount of a fluorescence material contained in the cleaning waste-liquid in real time, the reason why the completion of a cleaning operation can quantitatively be determined will be described. The criteria for determining the range of detecting the mist 34 by the detector 28 and the fluorescence material mixed in the inspection air will be discussed. It is to be noted that, herein, a mist of a riboflavin sodium phosphate aqueous solution as a mock contaminant will be described.

First, several types of riboflavin sodium phosphate aqueous solutions having varied concentrations are prepared. As described above, the solubility of riboflavin sodium phosphate to water was 50 g/L. Subsequently, 5 standard aqueous solution samples: $0.7 \times 10^{-2}$% by mass (sample 1); $0.7 \times 10^{-4}$% by mass (sample 2); $0.7 \times 10^{-6}$% by mass (sample 3); $3.5 \times 10^{-8}$% by mass (sample 4); and $0.7 \times 10^{-8}$% by mass (sample 5), and water containing no fluorescence material (comparative sample) were prepared. Table 1 shows the concentrations of these samples.

As to these samples, using the waste liquid container 25 and the ultrasonic atomizing device 26 described in FIG. 3, a mist 34 of each of the samples was generated. It is to be noted that, as to the mist size distribution, the mist of 0.3 μm or more accounted for 73 to 83% or more, and the mist of 0.5 μm or more accounted for 13 to 21% or more.

Then, the collector 27 collected air containing the generated mist 34 as inspection air. The inspection air collected by the collector 27 is supplied into the detector 28 via the suction pipe 28a to detect the fluorescence material. Table 1 shows the total particle concentration (/L), the positive particle concentration (/L), and the calculated positive particle ratio (%) detected.

TABLE 1

|  | Fluorescence material concentration (% by mass) | Positive particle ratio (%) | Total particle concentration (/L) | Positive particle concentration (/L) |
| --- | --- | --- | --- | --- |
| Sample 1 | $0.7 \times 10^{-2}$ | 42.0 | 280 | 117 |
| Sample 2 | $0.7 \times 10^{-4}$ | 5.5 | 1059 | 59 |
| Sample 3 | $0.7 \times 10^{-6}$ | 3.6 | 547 | 16 |
| Sample 4 | $3.5 \times 10^{-8}$ | 2.8 | 2527 | 92 |
| Sample 5 | $0.7 \times 10^{-8}$ | 2.8 | 623 | 17 |
| Comparative Sample | 0 | 2.2 | 345 | 8 |

As shown in Table 1, the positive particle ratios of samples 1 to 3 can be identified with the positive particle ratio of comparative sample (mist of water containing no fluorescence material). It is to be noted that, in samples 1 and 2, the ratios are obviously identified, particularly in sample 1. Accordingly, when a fluorescence material is dissolved in a mist in inspection air, it is found that the concentration of $0.7 \times 10^{-6}$% by mass or so (in $1 \times 10^{-6}$% by mass) can readily be detected. In addition, in samples 4 and 5, the concentration of $3.5 \times 10^{-8}$% by mass or $0.7 \times 10^{-8}$% by mass or so (in $1 \times 10^{-8}$% by mass) shows no identification with comparative sample and it can be determined that the fluorescence material is not dissolved.

It is to be noted that, in the main test, all the mists are aqueous solutions of fluorescence materials, and it seems that the total particle concentration is actually close to the positive particle concentration, and the positive particle ratio is approx. 100%. In addition, since the comparative sample contains no fluorescence material, it seems that the positive particle concentration is close to 0, and the positive particle ratio is close to 0%. The actual measurement, however, provided the above results. The discrepancy is attributed to the relationship between the size distribution of a mist generated by the ultrasonic atomizing device 26 used and the detection accuracy of the detector 28 used.

Consequently, the total particle concentration and the positive particle concentration in this embodiment may basically be interpreted as an apparent total particle concentration and an apparent positive particle concentration, respectively. In any case, in this embodiment, the concentration of an aqueous solution of a fluorescence material of $0.7 \times 10^{-6}$% by mass ($1 \times 10^{-6}$% by mass digit) can be set as the detection limit concentration. It is to be noted that, in this embodiment, as to an actually employed ultrasonic atomizing device and a detector combined, the above mentioned preliminary test is preferably carried out to confirm the detection limit concentration.

Figure 4:
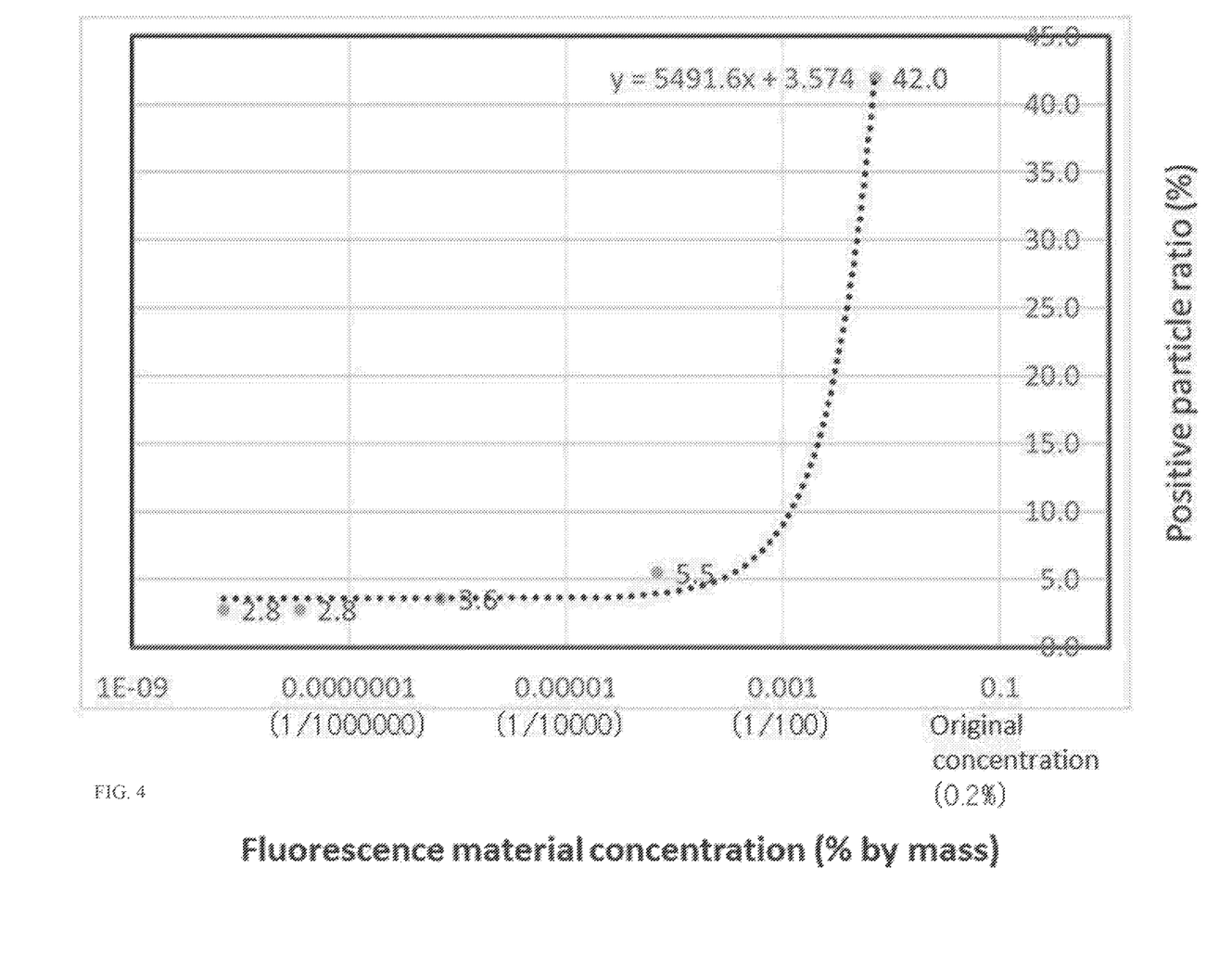
FIG. 4 is a graph showing the relationship between the fluorescence material concentration detected by a detector and the positive particle ratio.

Then, FIG. 4 shows a graph obtained from the results in Table 1. FIG. 4 is a graph showing the relationship between the fluorescence material concentration (% by mass) detected by a detector and the positive particle ratio (%) on each of the samples. In FIG. 4, the concentration of a fluorescence material dissolved into a mist of a mock contaminant administered to the inside of the chamber 12 was 0.2% by mass (right edge in the graph). The fluorescence material of the concentration is diluted by a cleaning operation to be dissolved in the cleaning waste-liquid 33, but this material can readily be detected in the beginning of cleaning.

Afterward, the concentration of the fluorescence material declines by a cleaning operation, below the value in $1 \times 10^{-6}$% by mass as the detection limit concentration, and when it comes to the value in $1 \times 10^{-8}$% by mass, it can be determined that the mock contaminant is removed by the cleaning operation. In FIG. 4, the detection limit concentration in $1 \times 10^{-6}$% by mass is 1/10000 of the concentration of the fluorescence material initially administered (0.2% by mass). In addition, the value in $1 \times 10^{-8}$% by mass in which it can be determined that a fluorescence material is not dissolved is 1/1000000 of the concentration of the fluorescence material initially administered (0.2% by mass). From these observations, in this embodiment, the cleaning-performance can quantitatively be determined in the range significantly above the initial concentration of 1/100 as a conventional standard.

Accordingly, in this embodiment, by continuously detecting the concentration of a fluorescence material of a cleaning waste-liquid discharged by a cleaning operation, the completion of the cleaning operation can quantitatively be determined. From this observation, the present invention can provide a cleaning-performance evaluation system without such factors as the experience of evaluators causing variations in evaluation that can acquire evaluation results in real time as quantitative values.

It is to be noted that the present invention is achieved not only by the above embodiment, but also by the following various alternative embodiments.

(1) In the above embodiment, the fluorescence material is riboflavin sodium phosphate, but the material is not restricted thereto, and riboflavin itself or other water-soluble fluorescence materials may be used.

(2) In the above embodiment, the chamber of the sealing isolator is used for evaluating the cleaning-performance, but the purpose is not restricted thereto, and the cleaning-performance may be evaluated in each position inside a clean room or RABS (restricted access barrier system).

(3) In the above embodiment, the contamination means for administering a mock contaminant to the inside of a chamber is an ultrasonic atomizing device for generating a mist by providing the aqueous solution of a fluorescence material with ultrasonic vibration, but the use is not restricted thereto, and the aqueous solution of the fluorescence material may conventionally be sprayed with a spray.

(4) In the above embodiment, a cleaning spray is used in a cleaning operation, but the use is not restricted thereto, and an automatic cleaning spray or hand-operated spray gun may be used.

EXPLANATIONS OF LETTERS OR NUMERALS

10 . . . Isolator,
11 . . . Frame,
12 . . . Chamber,
12a . . . Door,
12b . . . Glove port,
13 . . . Controller,
14a, 14b, 14c . . . Filter unit,
15 . . . Blower,
16 . . . Pass box,
17 . . . Bug-out port,
20 . . . Cleaning-performance evaluation system
21, 25 . . . Container,
22, 26 . . . Ultrasonic atomizing device,
23, 34 . . . Mist
24 . . . Wastewater pit,
27 . . . Collector,
28 . . . Detector,
24a, 25a, 28a . . . Pipe,
31 . . . Cleaning spray,
32 . . . Cleaning water,
33 . . . Cleaning waste-liquid.

The invention claimed is:

1. A cleaning-performance evaluation system used for evaluating a cleaning operation inside a work chamber, the system configured to function as an inspection system for inspecting the cleaning-performance of a mock contaminant generated inside the work chamber, the system comprising:
a contamination means configured to administer the mock contaminant to the inside of the work chamber;
a waste liquid recovery means configured to perform the cleaning operation and recovering a cleaning waste-liquid that contains the mock contaminant;
a mist generation means configured to generate a mist of the cleaning waste-liquid;
a collection means configured to collect for inspection air that includes the generated mist; and
a detection means configured to detect an amount of the mock contaminant included in the inspection air collected by the collection means, wherein
the cleaning operation is evaluated by confirming that the amount of the mock contaminant detected by the detection means is at or below a prescribed value.

2. The cleaning-performance evaluation system according to claim 1, wherein the detection means includes a fine particle detecting part and a fluorescence detecting part, the fine particle detecting part is configured to detect a total particle concentration of the mock contaminant in the inspection air, and
the fluorescence detecting part is configured to detect a positive particle concentration in the inspection air, whereby the system is further configured to calculate a positive particle ratio by the total particle concentration and the positive particle concentration to confirm the amount of the mock contaminant.

3. The cleaning-performance evaluation system according to claim 2, wherein the fluorescence detecting part is configured to detect the mock contaminant in the inspection air using laser induced fluorometry.

4. The cleaning-performance evaluation system according to claim 1, wherein the mist generation means is an ultrasonic atomizing device.

5. The cleaning-performance evaluation system according to claim 1, wherein the mock contaminant is an aqueous solution of a fluorescence material.

6. The cleaning-performance evaluation system according to claim 5, wherein the aqueous solution of the fluorescence material is an aqueous solution in which riboflavin or a derivative thereof is dissolved.

7. The cleaning-performance evaluation system according to claim 6, wherein the aqueous solution of the fluorescence material is an aqueous solution of riboflavin sodium phosphate.

* * * * *